(12) United States Patent
Vernik et al.

(10) Patent No.: US 10,644,809 B1
(45) Date of Patent: May 5, 2020

(54) SYSTEM AND METHOD FOR CRYOGENIC OPTOELECTRONIC DATA LINK

(71) Applicants: Hypres, Inc., Elmsford, NY (US); Center for Technology Licensing at Cornell University, Ithaca, NY (US); The Trustees of Columbia University in the City of New York, New York, NY (US)

(72) Inventors: Igor V. Vernik, Yorktown Heights, NY (US); Oleg A. Mukhanov, Putnam Valley, NY (US); Alan M. Kadin, Princeton Junction, NJ (US); Christopher Thomas Phare, New York, NY (US); Michal Lipson, New York, NY (US); Keren Bergman, Princeton, NJ (US)

(73) Assignee: SeeQC Inc., Elmsford, NY (US)

( * ) Notice: Subject to any disclaimer, the term of this patent is extended or adjusted under 35 U.S.C. 154(b) by 0 days.

(21) Appl. No.: 16/153,659

(22) Filed: Oct. 5, 2018

Related U.S. Application Data

(63) Continuation of application No. 15/356,030, filed on Nov. 18, 2016, now Pat. No. 10,097,281.
(Continued)

(51) Int. Cl.
*H04B 10/80* (2013.01)
*H04B 10/50* (2013.01)
(Continued)

(52) U.S. Cl.
CPC .......... *H04B 10/80* (2013.01); *H04B 10/505* (2013.01); *H04B 10/541* (2013.01); *H04B 10/5563* (2013.01)

(58) Field of Classification Search
None
See application file for complete search history.

(56) References Cited

U.S. PATENT DOCUMENTS

| | | | | |
|---|---|---|---|---|
| 8,182,917 | B2 * | 5/2012 | Robinson | B82Y 20/00 |
| | | | | 252/378 R |
| 8,535,553 | B2 * | 9/2013 | Kong | B82Y 30/00 |
| | | | | 216/83 |

(Continued)

*Primary Examiner* — Rhonda S Peace
(74) *Attorney, Agent, or Firm* — Tully Rinckey PLLC; Steven M. Hoffberg

(57) ABSTRACT

A cryogenic optoelectronic data link, comprising a sending module operating at a cryogenic temperature less than 100 K. An ultrasensitive electro-optic modulator, sensitive to input voltages of less than 10 mV, may include at least one optically active layer of graphene, which may be part of a microscale resonator, which in turn may be integrated with an optical waveguide or an optical fiber. The optoelectronic data link enables optical output of weak electrical signals from superconducting or other cryogenic electronic devices in either digital or analog form. The modulator may be integrated on the same chip as the cryogenic electrical devices. A plurality of cryogenic electrical devices may generate a plurality of electrical signals, each coupled to its own modulator. The plurality of modulators may be resonant at different frequencies, and coupled to a common optical output line to transmit a combined wavelength-division-multiplexed (WDM) optical signal.

20 Claims, 6 Drawing Sheets

Related U.S. Application Data

(60) Provisional application No. 62/256,991, filed on Nov. 18, 2015.

(51) Int. Cl.
*H04B 10/54* (2013.01)
*H04B 10/556* (2013.01)

(56) References Cited

U.S. PATENT DOCUMENTS

| | | | | |
|---|---|---|---|---|
| 8,836,446 B2* | 9/2014 | Sensale-Rodriguez | ............... | H03C 1/02 257/14 |
| 9,182,541 B2* | 11/2015 | Kim | ............... | G02F 1/011 |
| 9,344,127 B2* | 5/2016 | Hone | ............... | H04B 1/123 |
| 9,680,038 B2* | 6/2017 | Zhong | ............... | H01L 31/028 |
| 9,819,145 B2* | 11/2017 | Liang | ............... | H01S 5/0425 |
| 9,982,935 B2* | 5/2018 | Webber | ............... | F25D 19/006 |
| 10,097,281 B1* | 10/2018 | Vernik | ............... | H04B 10/80 |
| 10,222,416 B1* | 3/2019 | Inamdar | ............... | G01R 31/31712 |
| 10,243,660 B2* | 3/2019 | Chang | ............... | H04B 10/50 |
| 2013/0071083 A1* | 3/2013 | Kim | ............... | G02B 6/12 385/131 |
| 2013/0101247 A1* | 4/2013 | Cho | ............... | G02F 1/025 385/1 |
| 2014/0023321 A1* | 1/2014 | Lu | ............... | G02B 6/10 385/40 |
| 2016/0141835 A1* | 5/2016 | Liang | ............... | H01S 5/0425 372/4 |

* cited by examiner

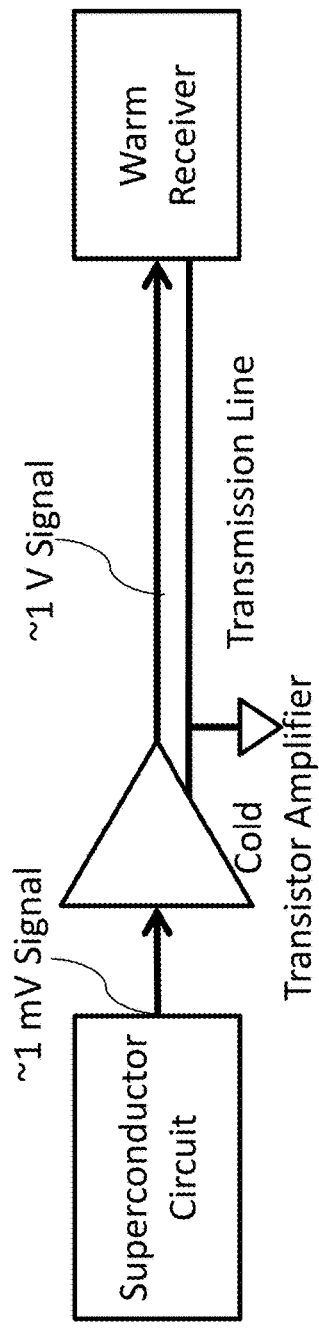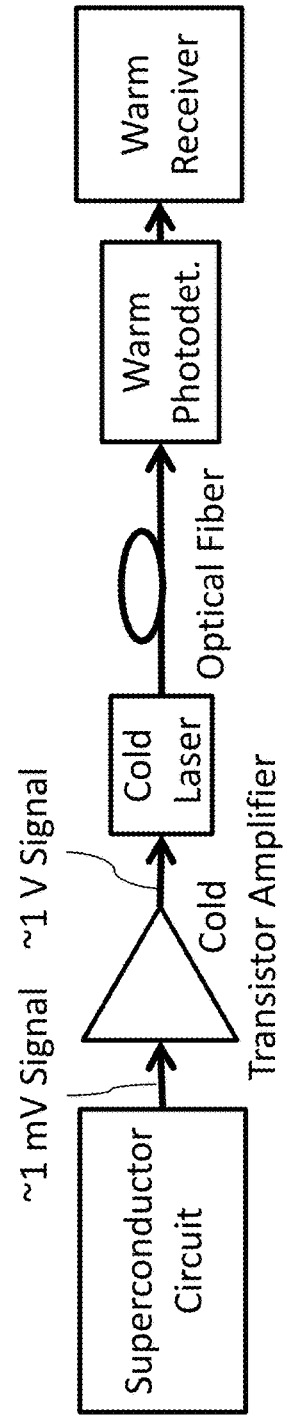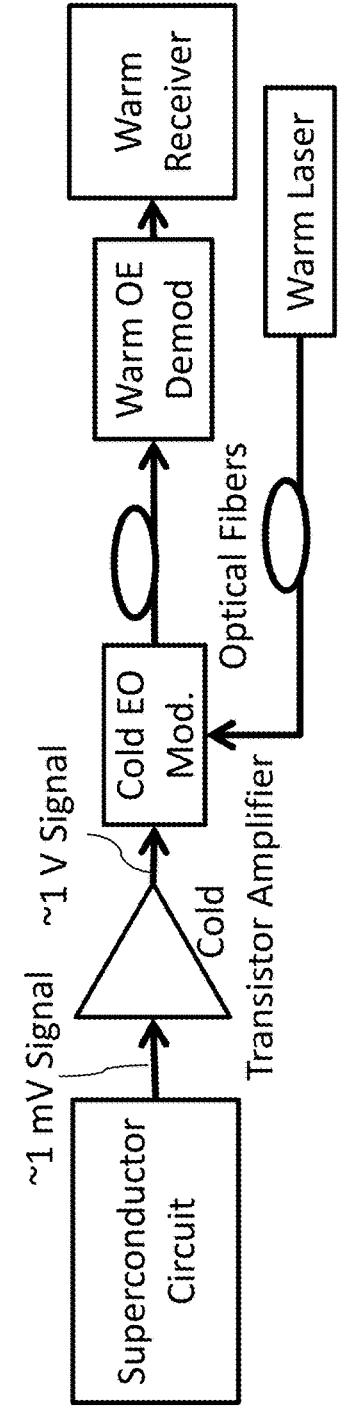
Fig. 1A. Prior Art
Fig. 1B. Prior Art
Fig. 1C. Prior Art

SYSTEM AND METHOD FOR CRYOGENIC OPTOELECTRONIC DATA LINK

CROSS REFERENCE TO RELATED APPLICATIONS

The present application is a Continuation of U.S. patent application Ser. No. 15/356,030, filed Nov. 18, 2018, now U.S. Pat. No. 10,097,281, issued Oct. 9, 2018, which is a non-provisional of, and claims benefit of priority from U.S. Provisional patent application Ser. No. 62/256,991, filed Nov. 18, 2015, the entirety of which is expressly incorporated herein by reference.

BACKGROUND OF THE INVENTION

There are several low-power cryogenic electronic technologies that require broadband communication of analog or digital data to conventional electronic systems at room temperature. These include ultrafast superconducting circuits for data conversion, radio communications, and computing, as well as superconducting circuits for quantum computing and sensitive imaging arrays across the electromagnetic spectrum. A key problem with these systems is that the characteristic voltage output of these low-power systems is 1 mV or even less, while room-temperature semiconductor electronic devices have a typical voltage level of order 1 V or more. In some cases, one can use a high-gain transistor amplifier to bridge this gap, but such transistor amplifiers may dissipate too much power for the cryogenic environment. Furthermore, the electrically conductive high-bandwidth transmission output lines themselves may conduct too much heat to the cryogenic environment. (See FIG. 1A.) See, for example, Wuensch et al., "Cryogenic Semiconductor Amplifier for RSFQ Circuits with High Data Rates at 4K", IEEE Transactions on Applied Superconductivity, vol. 19, pp. 574-579, 2009; Gupta et al., "Low-power High-Speed Hybrid Temperature Heterogeneous Technology Digital Data Links", IEEE Transactions on Applied Superconductivity, vol. 23, article 1701806, 2013.

The key issues for such devices include how much power dissipation is required in or near the cryocooler which maintains the superconductive electronics at operating temperature, how much heat transfer occurs into the cryocooler through the transmission lines, and how well the transmission lines perform. Ancillary issues relate to how large and/or complex are, and what type of circuits within the cryocooler are required to drive the transmission lines.

A promising alternative to electrical transmission lines is optical communication via optical fibers, which can be constructed to have high performance while conducting very little heat. Note that these optical transmission lines need not be very long, and therefore the optical signal may be weak as compared to long distance room temperature telecommunication fibers. This requires an electro-optic transducer at the low-temperature end, e.g., within the cryocooler or at an intermediate temperature, of which several types are well known in the prior art. These include several types of small semiconductor lasers (such as vertical cavity surface emitting lasers or VCSELs) and light-emitting diodes (LEDs). (See FIG. 1B.) See, for example, Mukhanov et al., "Development of Energy Efficient Cryogenic Optical Data Link", Proc. Superconductive Electronics Conference, 2013; Bunz et al., "Laser Diodes for Optical Readout of Cryoelectronics", *Proc. SPIE* 2226, Infrared Readout Electronics II, 50 (Jun. 23, 1994).

Alternatively, one may send an optical fiber with a carrier optical wave down to the cryogenic environment, and subject this carrier wave to modulation in an electro-optic modulator device. Several types of modulator devices are known in the prior art, but most of these are semiconductor devices that require an input voltage of order 1 V or more, and may also dissipate significant levels of power. Again, one could use a transistor amplifier to bridge the voltage gap, with the same power limitations as above. (See FIG. 1C.) See U.S. Pat. Nos. 4,810,978; 6,661,560; 5,210,637. Note that carrier mobility, may be low at cryogenic temperatures, and thus semiconductor technology amplifiers may have impaired performance.

See "Direct drive optical link for high-speed cryogenic data readout", www.sbir.gov/sbirsearch/detail/377697, Navy ID N11A-022-0400; Marek Osinski and Gennady A. Smolyakov; "Injection locked microring lasers for ultrafast modulation", spie.org/x84982.xml.

The prior art does not provide an optical source or modulator that is sensitive to an input signal of 1 mV or less, which dissipates very little heat and requires little or no input amplification to produce a detectable signal through an optical fiber of about 5-250 cm.

Very recently, electro-optic modulators based on the unique material graphene have been reported. Graphene comprises a single atomic layer of a hexagonal lattice of carbon atoms (though multiple layers may be provided in some cases), and can be viewed as a zero-gap semiconductor with extremely high electron mobility. (In multiple layer structures, electron mobility is anisotropic). Graphene is also a strong optical absorber over a broad optical band, which is remarkable given its single atomic layer. Together, these enable very small optoelectronic devices with low levels of power dissipation.

For example, U.S. Pat. No. 9,360,689, and U.S. patent application Ser. No. 2014/0056551 (Liu et al), "Graphene Based Optical Modulator", (see FIG. 2) provides a modulator which comprises either one or two graphene monolayers embedded in an optical waveguide. See also, U.S. Pat. No. 8,983,251 (Lu et al), "Electro-optical waveguide apparatus and methods thereof";

U.S. Pat. No. 9,042,283 (Cho et al.), "Optical modulator including graphene";

Jiaqi Wang, Zhenzhou Cheng, Zefeng Chen, Jian-Bin Xu, Hon Ki Tsang, and Chester Shu, "Graphene photodetector integrated on silicon nitride waveguide" J. Applied Physics 117, 144504 (2015);

Nathan Youngblood, Yoska Anugrah, Rui Ma, Steven J. Koester, and Mo Li, "Multifunctional Graphene Optical Modulator and Photodetector Integrated on Silicon Waveguides", dx.doi.org/10.1021/nl500712u, Nano Lett. 2014, 14, 2741-2746;

Steven J. Koester, Huan Li, and Mo Li, "Switching energy limits of waveguide-coupled graphene-on-graphene optical modulators", Optics Express, Vol. 20, No. 18, 20330 (27 Aug. 2012);

Nicholas Hunter, Alexander S. Mayorov, Christopher D. Wood, Christopher Russell, Lianhe Li, Edmund H. Linfield, A. Giles Davies, and John E. Cunningham, "On-Chip Picosecond Pulse Detection and Generation Using Graphene Photoconductive Switches", DOI: 10.1021/nl504116w, Nano Lett. 2015, 15, 1591-1596;

Luo et al. Nanoscale Research Letters (2015) 10:199, DOI 10.1186/s11671-015-0866-7; Muhammad Mohsin, Daniel Neumaier, Daniel Schall, Martin Otto, Christopher Matheisen, Anna Lena, Giesecke, Abhay A. Sagade & Heinrich Kurz, "Experimental verification of electro-refractive phase modulation in graphene", Scientific Reports 5, Article number: 10967 (2015), doi:10.1038/srep10967;

Liu, Ming, Xiaobo Yin, and Xiang Zhang. "Double-layer graphene optical modulator." *Nano letters* 12.3 (2012): 1482-1485;

Liu, Ming, et al. "Graphene optical modulator." SPIE NanoScience+Engineering. International Society for Optics and Photonics, 2011; Midrio, Michele, et al. "Graphene-assisted critically-coupled optical ring modulator." *Optics express* 20.21 (2012): 23144-23155;

Xu, Chao, et al. "Characteristics of electro-refractive modulating based on Graphene-Oxide-Silicon waveguide." *Optics express* 20.20 (2012): 22398-22405;

Locatelli, Andrea, et al. "Graphene-assisted control of coupling between optical waveguides." *Optics express* 20.27 (2012): 28479-28484;

Gosciniak, Jacek, and Dawn TH Tan. "Theoretical investigation of graphene-based photonic modulators." *Scientific reports* 3 (2013);

Midrio, Michele, et al. "Graphene-based optical phase modulation of waveguide transverse electric modes." *Photonics Research* 2.3 (2014): A34-A40;

Gosciniak, Jacek, and Dawn TH Tan. "Graphene-based waveguide integrated dielectric-loaded plasmonic electro-absorption modulators." *Nanotechnology* 24.18 (2013): 185202;

Mohsin, Muhammad, et al. "Graphene based low insertion loss electro-absorption modulator on SOI waveguide." *Optics express* 22.12 (2014): 15292-15297;

Ryzhii, Victor, et al. "Double-graphene-layer terahertz laser: concept, characteristics, and comparison." *Optics express* 21.25 (2013): 31567-31577;

Tamagnone, Michele, et al. "Fundamental limits and near-optimal design of graphene modulators and non-reciprocal devices." *Nature photonics* 8.7 (2014): 556-563;

Koester, Steven J., and Mo Li. "Waveguide-coupled graphene optoelectronics." *Selected Topics in Quantum Electronics, IEEE Journal of* 20.1 (2014): 84-94;

Ye, Shengwei, et al. "Electro-absorption optical modulator using dual-graphene-on-graphene configuration." *Optics express* 22.21 (2014): 26173-26180;

Cho, Seong-Ho, and Hyun-jong Chung. "Optical modulator including graphene."

Chen, Pai-Yen, et al. "Graphene-based plasmonic platform for reconfigurable terahertz nanodevices." *ACS Photonics* 1.8 (2014): 647-654;

Kwon, Min-Suk. "Discussion of the epsilon-near-zero effect of graphene in a horizontal slot waveguide." *Photonics Journal, IEEE* 6.3 (2014): 1-9;

Phare et al, "Graphene Electro-Optic Modulator with 30 GHz Bandwidth", Nature Photonics, vol. 9, pp. 511-514, August 2015 (See FIG. 3), shows a high-Q optical resonator, of which the graphene layer is a part. Applying a voltage tunes the Fermi energy of the graphene via the field effect, which in turn affects the optical absorption in the graphene, and changes the Q and hence the impedance of the resonator, thus shifting the resonance slightly and modulating the transmitted optical wave.

All of these disclose devices designed to operate at room temperature, with no cryogenic properties disclosed or predicted. Some of these devices are somewhat sensitive to small voltages, and further have other important advantages, such as compact size and broad optical bandwidth.

There are several recent reports of graphene devices operating at cryogenic temperatures, including hybrid devices with superconducting materials. See, for example, see:

McKitterick et al., "Graphene Microbolometers with Superconducting Contacts for Terahertz Photon Detection", published online July 2013 at arxiv.org/abs/1307.5012;

Calado et al., "Ballistic Josephson Junctions in Edge-Contacted Graphene", published online June 2015 at arxiv.org/abs/1501.06817;

Chapman et al., "Superconductivity in Ca-Doped Graphene", published online August 2015 at arxiv.org/abs/1508.06931;

Weber et al., "Coupling graphene mechanical resonators to superconducting microwave cavities, published online April 2014 at http://arxiv.org/abs/1403.4792;

U.S. Pat. Nos. 5,210,637; 5,566,015; 5,568,302; 6,115,170; 6,285,487; 6,515,788; 6,429,958; 4,906,930; 5,239,548; 5,247,183; 5,258,619; 5,271,074; 5,477,158; 5,488,504; 5,491,334; 5,519,526; 5,519,529; 5,710,426; 5,812,318; 5,917,195; 6,009,114; 6,168,081; 6,471,126; 6,473,218; 6,563,622; 6,656,528; 6,661,560; 6,665,111; 6,710,367; 6,819,460; 6,970,279; 6,977,767; 7,265,712; 7,368,280; 7,401,514; 7,413,147; 7,420,994; 7,667,200; 7,709,799; 7,733,926; 7,781,736; 7,781,739; 7,782,914; 7,820,970; 7,903,338; 7,920,616; 8,039,819; 8,111,722; 8,116,003; 8,116,624; 8,182,917; 8,217,381; 8,223,342; 8,237,324; 8,260,143; 8,260,144; 8,260,145; 8,303,514; 8,368,118; 8,432,611; 8,471,238; 8,548,334; 8,554,022; 8,571,075; 8,633,573; 8,705,983; 8,729,524; 8,755,662; 8,767,192; 8,780,677; 8,786,950; 8,787,410; 8,792,525; 8,829,471; 8,867,026; 8,867,931; 8,873,131; 8,919,428; 8,963,090; 8,963,265; 8,969,903; 9,020,362; 9,024,415; 9,029,782; 9,042,683; 9,057,639; 9,083,457; 9,143,702; 9,182,541; 9,188,953; 9,195,005; 9,195,052; 9,204,931; 9,212,948; 9,244,268; 9,252,554; 9,252,561; 9,274,352; 9,291,836; 9,297,955; 9,303,309; 9,318,872; 9,324,733; 9,395,473; 9,411,176; 9,426,545; 9,431,565; 9,450,696; 9,477,101; 20020036814; 20020105948; 20020168134; 20030042487; 20030094433; 20030186521; 20040095627; 20040208602; 20050286603; 20060045807; 20060049981; 20060198397; 20070045474; 20070242705; 20080157235; 20080298401; 20080310470; 20090067468; 20090206262; 20090232191; 20090232507; 20090232510; 20090235721; 20090283680; 20100074281; 20100171393; 20100200208; 20100231921; 20100252750; 20100320443; 20110158653; 20110241072; 20120129269; 20120133931; 20120138887; 20120140236; 20120194885; 20120205352; 20120208027; 20120243874; 20120260983; 20120327608; 20120328301; 20130002472; 20130003066; 20130004180; 20130042679; 20130050788; 20130071083; 20130101247; 20130176836; 20130289671; 20130315597; 20140007677; 20140013841; 20140022533; 20140023321; 20140060178; 20140084163; 20140084325; 20140085693; 20140085865; 20140102191; 20140103213; 20140105553; 20140199550; 20140202994; 20140218738; 20140224989; 20140294338; 20140308682; 20140313468; 20140327862; 20140341496; 20140374872; 20150063739; 20150093515; 20150125155; 20150168747; 20150192532; 20150194789; 20150236791; 20150240086; 20150303256; 20150318667; 20150382089; 20160005894; 20160033849; 20160041095; 20160062009; 20160084761; 20160094342; 20160097963; 20160099537; 20160103341; 20160115032; 20160116288; 20160118527; 20160139487; 20160141835; 20160187256; 20160208383; 20160212512; 20160226216; 20160245687; 20160259059; 20160298030; 20160307939; 20160308006; and 20160308075.

Each reference cited herein is expressly incorporated herein by reference in its entirety.

SUMMARY OF THE INVENTION

The present technology provides a cryogenic optoelectronic data link which supports transmission of data out of a cryogenic environment, e.g., less than 80K or less than 25K, or less than 12.5K, as a modulated optical signal. The optical modulator comprises a graphene sheet whose optical properties are modulated by a low voltage (e.g., <1 mV) electrical signal, operating on an optical signal that may be provided internally to or externally from the cryocooler. The term "optical" includes wavelengths from 100 µm to 32 nm, but preferably within a range to which a silicon or germanium photodetector is responsive, e.g., 190-1700 nm. A preferred embodiment comprises, at the sending end, an optical modulator based on at least one graphene sheet, configured to operate at cryogenic temperatures less than about 25K, which is sensitive to very small voltage levels of order 1 mV. The sensitivity is based on the tunability of the Fermi energy of the graphene via the field effect. A key aspect of the invention is the realization that because of the unique electronic band structure of graphene (in particular, the absence of an energy gap between the valence and conduction bands), the voltage sensitivity of a properly designed optical modulator will be much greater at cryogenic temperatures than at room temperature. Since the Fermi level smearing is approximately $k_B T$ (and so is the noise energy of the device), a scaling analysis shows that this modulator should become more sensitive, approximately as 1/T. Comparing a temperature of 4 K with room temperature (300 K), it is expected that the sensitivity to improve by a factor of about 300/4=75. In contrast to a conventional semiconductor device, where the voltage scale ~1V is set by the typical energy gap ~1 eV, here the voltage sensitivity is ~$4k_B T/e$, to get above the thermal noise. This gives a sensitivity ~0.1 V at room temperature, ~1 mV at 4K, and intermediate values in between.

Because of the improved sensitivity, in a preferred embodiment, the graphene modulator may be used to directly interface with the output from a superconducting circuit, such as a rapid single flux quantum (RSFQ) circuit based on niobium or niobium nitride trilayer Josephson junctions, without the need for any semiconductor transistor amplifier, as shown in the block diagram of FIG. 4. However, the superconducting output circuit may preferably comprise one of several superconducting output amplifiers known in the art. These may include, for example, a single flux quantum (SFQ)/DC converter, a superconducting quantum interference device (SQUID) amplifier, a SQUID stack amplifier, a superconducting-ferromagnetic transistor, or an nTron. See, McCaughan, Adam N., and Karl K. Berggren. "A superconducting-nanowire three-terminal electrothermal device." Nano Letters 14.10 (2014): 5748-5753. These devices are low in power, and can output fast multi-GHz signals of order 1 mV in amplitude. See, for example, U.S. Pat. Nos. 5,936,458; 7,468,630; WO2014/197047; U.S. Pat. No. 7,724,083; 7,816,940; 8,971,977; 8,933,695.

In a preferred embodiment of the invention, the modulator may comprise a high-Q optical resonator of which the graphene sheet is strongly coupled, similar to that shown in FIG. 3. Metallic electrodes may comprise superconducting metals (such as niobium), so that the Q may be higher than that available at room temperature, and series resistance should be very small (and dominated by contact resistance). In this way, RC time constants should be very small, enabling modulation with a very broad signal bandwidth, of as much as 100 GHz.

In another preferred embodiment, a modulator may be integrated with a superconducting circuit on the same chip. For example, FIG. 5 shows an optical waveguide on a chip comprising a superconducting circuit, where one or more graphene-based modulators are coupled to the optical waveguide. If a plurality of modulators are resonant at slightly different frequencies, and the optical carrier signal on the input to the optical waveguide comprises a plurality of optical wavelengths corresponding to the plurality of resonant frequencies, then a plurality of modulated optical signals can be simultaneously transmitted on the output of the optical waveguide. This comprises a wavelength-dispersive multiplexed (WDM) optical signal, which can be transmitted on an optical fiber up to room temperature (see FIG. 6). Such WDM signals are known in the prior art for optical fiber communication, and devices to demodulate such signals to recover the microwave-frequency communication signals are commercially available. See, for example, US patent applications2009/0103863; 2004/0114867; U.S. Pat. No. 6,778,318. Commercial WDM systems for up to 64 (or even 128) channels are available. A similar demodulation procedure may be applicable to the plurality of weak electronic signals from the plurality of superconducting circuits. Such a multiplexed system, with only a single optical fiber for multi-carrier input and a single fiber for output, can dramatically simplify the cryogenic packaging and system integration.

It is noted that an optical detector may also be created using a similar structure or enhanced structure, e.g., an ultra-broadband photodetector design based on a graphene double-layer heterostructure. For example, see Liu, Chang-Hua; Chang, You-Chia; Norris, Theodore B.; Zhong, Zhaohui; "Ti-Graphene photodetectors with ultra-broadband and high responsivity at room temperature", Nat Nano, (2014/04), vol. 9, iss. 4, pp. 273-278, dx.doi.org/10.1038/nnano.2014.31, 10.1038/nnano.2014.31. www.nature.com/nnano/journal/v9/n4/abs/nnano.2014.31.html#supplementary-information. The detector is a phototransistor consisting of a pair of stacked graphene monolayers (top layer, gate; bottom layer, channel) separated by a thin tunnel barrier. Under optical illumination, photoexcited hot carriers generated in the top layer tunnel into the bottom layer, leading to a charge build-up on the gate and a strong photogating effect on the channel conductance. The devices demonstrated room-temperature photodetection from the visible to the mid-infrared range, with mid-infrared responsivity higher than 1 A $W^{-1}$. See also, Fengnian Xia, Thomas Mueller, Yu-ming Lin, Alberto Valdes-Garcia and Phaedon Avouris, "Ultrafast graphene photodetector", *Nature Nanotechnology* 4, 839-843 (2009);

Freitag, Marcus. et al. "Photoconductivity of biased graphene." *Nature Photonics* 7.1 (2013): 53-59;

Freitag, Marcus, Tony Low, and Phaedon Avouris. "Increased responsivity of suspended graphene photodetectors." *Nano letters* 13.4 (2013): 1644-1648;

Shiue, R., et al. "Integrated Graphene-Based Photonic Devices." *Photonics, Optoelectronics:* 94;

Gulbahar, Burhan. "Nanoscale Optical Communications with Graphene." V. National Communication Technologies Symposium, ITUSEM, Izmir, Turkey, May 2013;

Kalugin, Nikolai G., et al. "Graphene-based quantum hall effect infrared photodetectors." *SPIE OPTO*. International Society for Optics and Photonics, 2012.

A quantum stark effect modulator or sensor may also be employed, using a grapheme layer heterostructure. Liu, Ming, et al. "A graphene-based broadband optical modulator." Nature 474.7349 (2011): 64-67; Min, Hongki, et al. "Intrinsic and Rashba spin-orbit interactions in graphene sheets." Physical Review B 74.16 (2006): 165310; Lu, Zhaolin, and Wangshi Zhao. "Nanoscale electro-optic modulators based on graphene-slot waveguides." JOSA B 29.6 (2012): 1490-1496.

In a preferred embodiment of the invention, the sending module of the cryogenic optoelectronic data link is at a cryogenic temperature of less than 100 K, or even more preferred, less than 10 K. The receiving module of the cryogenic optoelectronic data link may be at room temperature, or alternatively could also be at a cryogenic temperature, or any temperature less than room temperature. For example, one may consider a data link between two superconducting circuits on separate chips, but sharing the same cryogenic environment. Or the receiving module may be located in a different cryogenic environment. In another example, the sending and receiving modules are located at substantially different temperatures, such as 4 K for the sending module and 30-100 K for the receiving module, as might be the case if the optoelectronic data links connected a low-temperature superconducting circuit with a high-temperature superconducting circuit. In another example, the optoelectronic data link might connect an ultra-low-temperature circuit operating at 1 K or less (such as a sensor or quantum computing circuit) with a low temperature circuit operating at 4 K or above. These examples are in no way exclusive, and just illustrate the wide range of potential cryogenic applications for which the invention may solve the data interface problem.

The optoelectronic demodulator circuit at the receiving module may comprise a photoconductive (or photoresistive) device. The photoconductive device may also comprise a low-power optoelectronic device comprising at least one graphene sheet (see, for example, U.S. Pat. No. 8,053,782), which may also be operated at a temperature below room temperature. However, for a receiver at room temperature, the power constraint may be less critical, and other more conventional materials may suffice.

In general, the performance criteria are functionally specified, and would generally involve the modulator, communication channel and receiver, to set forth minimum performance criteria. In general, in a digital communication system, the raw bit error rate should be less than $10^{-2}$ or $10^{-3}$, and typically less than $10^{-6}$. This margin allows the performance to be extended, at the expense of throughput, by use of error detection and correction codes, as well as redundancy. Below $10^{-2}$ bit error rate, it is likely that the required codes (encoding) for reliable communications would consume a sufficient amount of the available bandwidth to render the communication link infeasible.

The preferred modulators receive an input having a voltage of less than 10 mV peak, and preferably less than about 1 mV peak, and are typically not amplified to a higher voltage. The lack of a bandgap in graphene and the low noise at cryogenic temperatures mean that the properties, including optical properties, may be effectively modulated near 0V. Therefore, with such inputs, a suitable phase and/or amplitude modulation may be achieved. For example, in a low noise environment, an amplitude change of 0.05 dB, 0.1 dB, or 0.2 dB should be detectable. Likewise, a phase shift of 0.05 radians, 0.1 radians, or 0.2 radians should be detectable.

In a preferred embodiment, the optical beam is frequency modulated (and at least during transitions, is phase modulated). Under such circumstances, the modulated signal is distinct from the carrier, and the ratio or phase relationship is not directly relevant. Rather, the carrier may be filtered from modulated signal, and the modulated signal is detectable if it is detectable or statistically distinguishable from the noise. The noise, in turn, derived from the three basic components of the system, the modulator, communication channel, and receiver. Since the modulator operates at cryogenic temperatures, which may be <11 K, there is a low thermal noise, and receiver noise may dominate the analysis. Thus, the low voltage input signal can be effectively used, even if the fractional change in properties of the modulated material, which in this case is preferably a single atomic monolayer, and more preferably graphene, is small.

In some cases, the system operates in an analog mode, or the performance is not considered in terms of "bit" error rates, but rather analog distortion. This may be true even if the modulating signal is generated as digital pulses, e.g., from Josephson junctions. For example, in a radio receiver system, the pulses may represent a pulse modulated oversampled representation of a radio frequency channel or band, and the output is to be demodulated as a radio frequency signal. This may be appropriate where the purpose of the superconducting electronics is to deconvolve multiple signals which are received together. In this case, the errors may be considered statistically instead of digitally, though error correction and detection codes would not be applicable to improve performance, but perhaps redundant communication channels if subject to uncorrelated errors might be.

It is therefore an object to provide an electro-optic communication system, comprising: an optical modulation module, comprising at least one layer of graphene, configured to modulate an optical carrier input signal based a voltage input signal, to generate a modulated optical signal; and an optical receiving module, configured to demodulate the modulated optical signal to produce a representation of the voltage input signal. The optical receiving module may be adapted to be responsive to changes in the amplitude of the voltage input signal of less than about 10 mV, and more preferably less than about 1 mV, to communicate digital signals e.g., at a rate of at least 1 gigabits per second at a bit error rate of less than $10^{-3}$. The receiver may employ traditional, room temperature technologies, while the modulator is preferably maintained at a cryogenic temperature, preferably less than 120K, more preferably less than 100K, and for example at <25K, <11K, and about 4K. According to one embodiment, a superconducting contact material induces at least a portion of the graphene into a superconducting state.

It is also an object to provide an optical modulator, comprising: at least one layer of graphene, modulated by a voltage input signal having an amplitude less than about 10 mV, at a temperature of less than about 100 K, and at a rate of at least 1 gigabits per second or a frequency of at least 1 GHz, the at least one layer of graphene having an optical property altered by the voltage input signal to produce a modulated optical signal from an optical carrier signal; and at least one optical port configured to transmit the modulated optical signal.

It is a still further object to provide a cryogenic optoelectronic modulator, comprising: at least one voltage input port, configured to receive at least one input signal having a full scale magnitude less than about 10 mV; a pathway configured to carry the at least one input signal, which is superconducting at temperatures below 100K; an optical carrier input port, configured to receive an optical carrier wave; an electro-optic modulator, configured to operate at a cryogenic temperature less than about 100 K, comprising at least one layer of graphene, configured to modulate the optical carrier wave in dependence on at least the at least one input signal to produce a modulated optical carrier wave; and a modulated optical output port, configured to transmit the modulated optical carrier wave.

It is therefore an object to provide an electro-optic communication method, comprising: providing an optical modulation module, comprising at least one layer of graphene, configured to modulate an optical carrier input signal based a voltage input signal, to generate a modulated optical signal; modulating an optical carrier with the optical modulation module, and demodulating the modulated optical signal with an optical receiving module, to produce a representation of the voltage input signal.

It is also an object to provide an optical modulation method, comprising: providing at least one layer of graphene, having an optical property modulated by a voltage input signal having an amplitude less than about 10 mV, at a temperature of less than about 100 K, and at a rate of at least 1 gigabits per second or a frequency of at least 1 GHz, to produce a modulated optical signal from an optical carrier signal; and transmitting the modulated optical signal through at least one optical port.

It is a still further object to provide a cryogenic optoelectronic modulation method, comprising: receiving at least one input signal having a full scale magnitude less than about 10 mV, communicated over at least a pathway which is superconducting at temperatures below 100K; receiving an optical carrier wave; and modulating the optical carrier wave with an electro-optic modulator, operating at a cryogenic temperature less than about 100 K, comprising at least one layer of graphene, dependent on at least the at least one input signal, to produce a modulated optical carrier wave.

The at least one input signal may have a full scale magnitude less than about 1 mV.

The pathway configured to carry the at least one input signal, which is superconducting at temperatures below 100K may be a high temperature superconductor, a low temperature superconductor, and is preferably niobium or niobium nitride.

The optical carrier input port may be a free space optic or a solid waveguide, e.g., a fiber optic or conduit disposed on an integrated circuit.

The optical carrier is typically generated outside of a cryogenic cryocooler, and fed in through a fiber optic. However, in some cases, a cryogenic electromagnetic radiation source may be provided, and indeed in some cases the electromagnetic radiation source may comprise graphene.

The electro-optic modulator may be configured to operate at a cryogenic temperature less than about 50K, 25K, 12K, or 4K (liquid helium), or below. Typically, microKelvin temperature operation is inefficient if there is incident electromagnetic radiation, though if carefully controlled, the optical heating may be less than the heart leakage through Ohmic contacts.

The electro-optic modulator may thus operate at a temperature near 4 K.

The modulated optical carrier may have a modulation of amplitude of at least 0.2 dB. The modulated optical carrier may have a modulation of phase of at least 0.02 radians. The modulated optical carrier may be frequency modulated, e.g., by a graphene ring oscillator.

The at least one input signal may have at least one frequency component greater than about 1 GHz. The modulated optical carrier wave may represent the at least one frequency component greater than about 1 GHz with a signal to noise ratio of at least 1 dB and a modulation of amplitude of at least 0.2 dB or a modulation of phase of at least 0.02 radians. The modulated signal may be a frequency modulated optical signal having an amplitude of greater than about −160 dB with respect to the carrier optical signal in the modulated output, and preferably greater than about −140 dB, and more preferably greater than about −120 dB. The frequency modulated optical signal is preferably modulated at a frequency of at least 10 GHz, and more preferably at least 20 GHz, from the carrier optical frequency.

The at least one layer of graphene may be configured to change optical properties in response to the at least one input signal.

The at least one input signal may have a bandwidth of at least 10 GHz.

The at least one voltage input port may be connected to an output of a superconducting circuit, without an intervening transistor amplifier. The superconducting circuit and the electro-optic modulator may be integrated on a common substrate.

A plurality of voltage input ports may be provided, configured to carry a plurality of input signals that are multiplexed on the optical carrier wave by the electro-optic modulator. For example, the multiplexing may comprise wavelength division multiplexing a plurality of different optical carrier wavelengths. In this case, a plurality of optical ting modulators are provided, with different nominal modulation frequencies, e.g., 10 GHz, 20 GHz, 30 GHz, etc., and thus the respective input signals modulate the carrier optical signal in different bands, separable by filtering at the receiver.

According to another embodiment, a plurality of optical carriers are provided at different wavelengths, and the modulated optical carrier may have a respective modulation for each of a plurality of optical carrier wavelengths.

According to further embodiment, the output modulated signal(s) are carrier by a multimode optical fiber, and are separated according to mode at the receiver. In a multimode embodiment, each modulated signal can have the same nominal modulation frequency (or be modulated at baseband).

The system may comprise an integrated optical waveguide adjacent to at least one layer of graphene.

An optical fiber may be provided which is configured to carry at least one of the optical carrier wave and the modulated optical carrier wave.

The electro-optic modulator may comprise an optical resonator, e.g., a micro-ring resonator. The optical resonator may comprise a linear micro-resonator. The electro-optic modulator may comprise a plurality of optical resonators, each driven by one of a plurality of input signals, where each resonator has a unique and different resonant frequency. The plurality of resonant frequencies of the plurality of resonators may comprise an optical frequency comb.

The at least one input signal may comprise a single-bit serial digital signal. Alternately, the at least one input signal may comprise a serial multi-bit digital signal or a plurality of parallel digital signals. The at least one input signal may also comprise one or more analog signals.

The energy per bit dissipated by the electro-optic modulator at the cryogenic temperature is preferably less than about 1 pJ/bit.

BRIEF DESCRIPTION OF THE DRAWINGS

FIG. 1A shows a block diagram of an electrical signal output from a superconducting circuit in the prior art, using a cooled transistor amplifier.

FIG. 1B shows a block diagram of an optoelectronic signal output from a superconducting circuit in the prior art, using a cryogenic semiconductor laser and a cooled transistor amplifier.

FIG. 1C shows a block diagram of an optoelectronic signal output from a superconducting circuit in the prior art, using a cryogenic electro-optic modulator and a cooled transistor amplifier.

DETAILED DESCRIPTION OF THE PREFERRED EMBODIMENTS

The present technology may be used to provide an external interface for a superconducting circuit comprising an ultrafast microprocessor that generates 64-bit digital words at a clock rate of 25 GHz, at a temperature of 4 K. Such a circuit could be designed using Rapid-Single-Flux-Quantum (RSFQ) logic, or one of its low-power alternatives known as Reciprocal Quantum Logic (RQL), Energy-Efficient RSFQ, or Quantum Flux Parametron. See, for example, U.S. Pat. Nos. 8,571,614; 7,843,209; 7,786,748.

Logic gates in these technologies exhibit switching energies of order $10^{-18}$ J/gate, corresponding to signal levels of order 1 mV and 0.5 mA for 2 ps. For a chip with one million gates at a clock rate of 25 GHz, this corresponds to a total power dissipation of 25 mW. The power associated with input/output lines and drivers at 4 K should be comparable to this. Taking a 64-bit data bus from 4 K to room temperature, 25 mW corresponds to 0.015 pJ/bit, an extremely small value. In contrast, most conventional data links require energies much greater than 1 pJ/bit.

Figure 3:
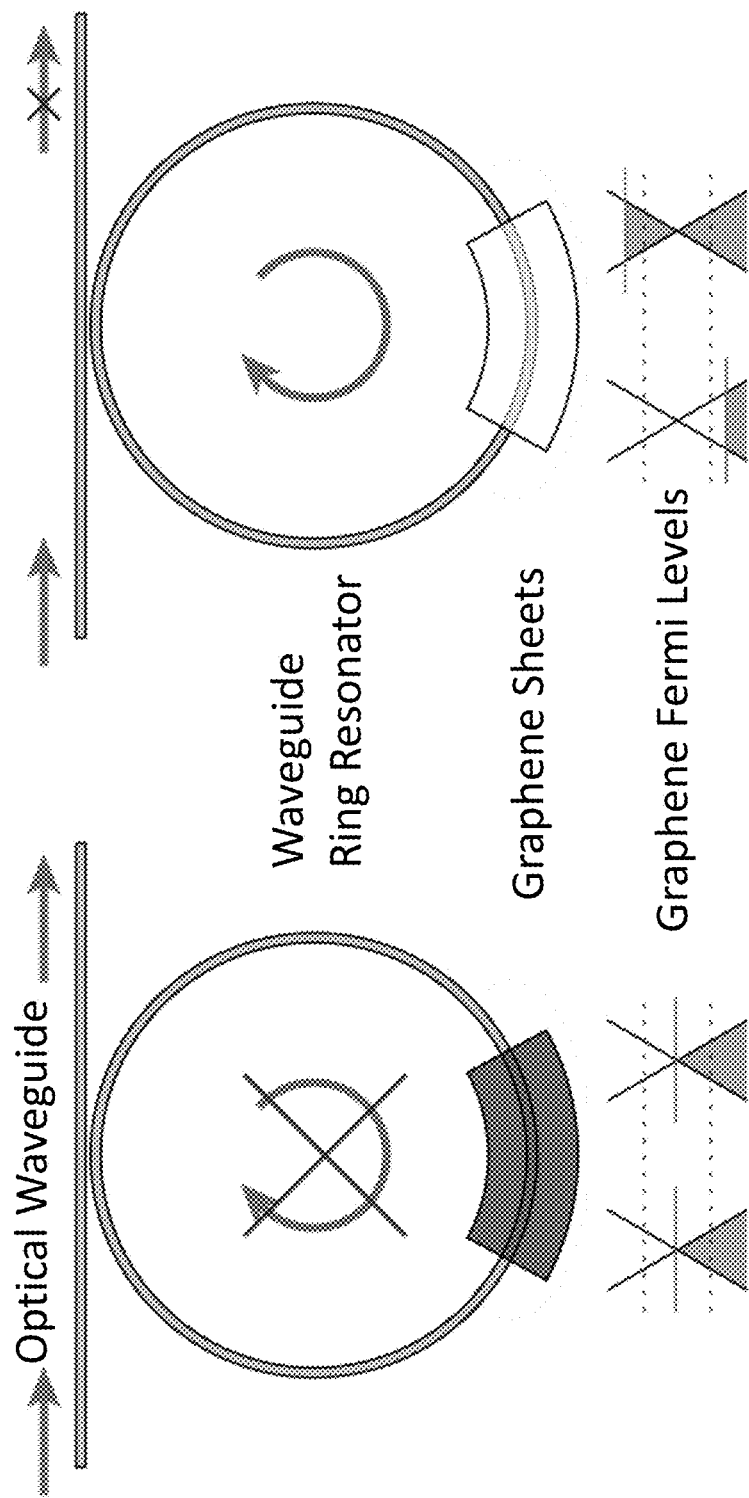
FIG. 3 shows a conceptual diagram of the functioning of a prior art graphene electro-optic modulator, from Phare et al (Nature Photonics, vol. 9, pp. 511-514, August 2015).
Figure 4:
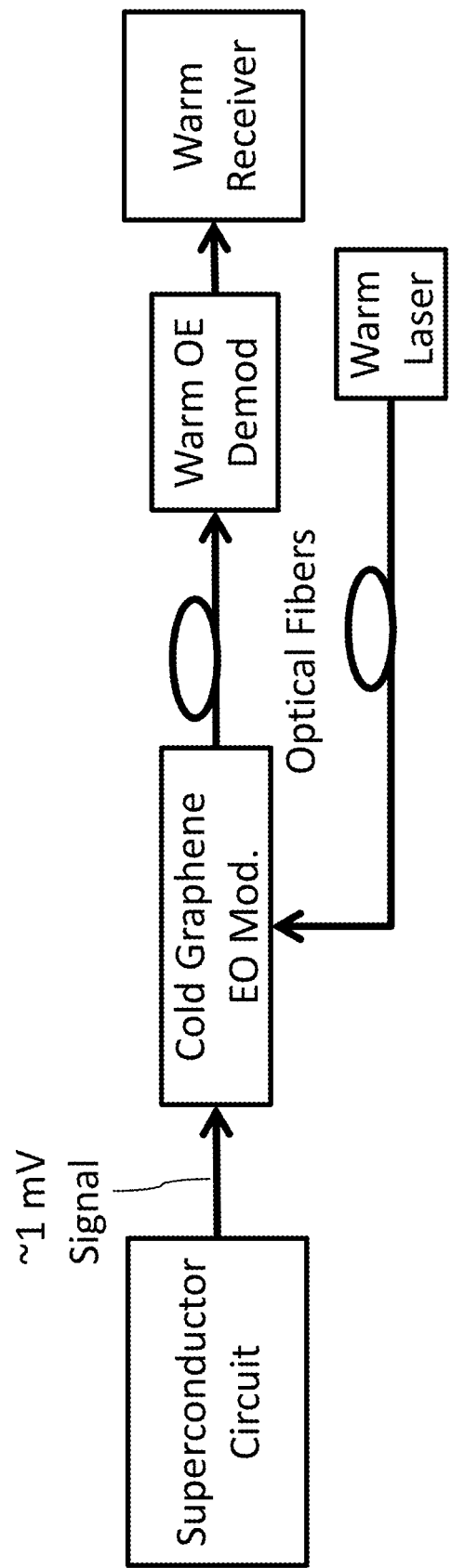
FIG. 4 shows a block diagram of one embodiment of an optoelectonic signal output from a superconducting circuit according to the present invention, using a cryogenic graphene electro-optic modulator without a cooled transistor amplifier.

Table 1 presents estimates of the link energy budget for the Cryogenic Graphene Modulator approach of the present invention, based on the system of FIG. 4 and the Micro-ring Modulator of FIG. 3. This is for a 25 Gb/s rate with 64 channels, modulated (using WDM) on the same optical output line. Table 1 shows an estimated 1.66 pJ/b in total for the Graphene modulator approach, with only 0.31 pJ/b dissipated at 4 K. This is a crude estimate, but is quite promising. These numbers assume a laser source with a power of ~10 mW, with a typical ~20% energy efficiency.

TABLE 1

Data Link Energy Budget for
Cryogenic Graphene Modulator with WDM

| | Energy (pJ/b) |
|---|---|
| Link Components @4K | 0.31 |
| Micro-ring Modulator | 0.01 |
| Graphene Modulator Driver | 0.3 |
| Link Components at 300K | 1.35 |
| Laser Source (assuming 20% efficiency) | 0.35 |
| Photodetector/Receiver | 1 |

In Table 2 below, the results of Table 1 are compared to other alternative link technologies (FIGS. 1A, 1B, and 1C). Despite the crude estimates in Table 2, the analysis makes clear that the integrated Graphene Modulator at 4 K is the most promising approach, in terms of minimum energy, channel scaling, and compatibility of fabrication with the superconducting circuits.

TABLE 2

Comparison of Alternative Approaches for Data Output Link

| Approach | Signal Level (mV) | Energy (pJ/b) | Channel Scaling | Fabrication Compatibility |
|---|---|---|---|---|
| Cryo-Graphene Resonator @ 4K (FIGS. 3-6) | 1 mV | 1.3 pJ/b, but only 0.3 @ 4K. | Single fiber link for 64 b word using WDM | Integrate with superconding IC fab. |
| Electrical Amplifier @ 4K-300K (SiGe) (FIG. 1A) | Progressive amplification up to 1 V in multiple stages | ~100 pJ/b, distributed over multiple stages | Amp. Chain + Wire/bit Energy cost from cable heat leaks | Separate chips, multi-stage packaging |
| Cryo-VCSEL @ 40-70K (FIG. 1B) | 1-10 mV (Proposed but not yet verified) | ~2-20 pJ/b estimated | VCSEL + fiber/bit + cable from 4-40K. | Separate chips, complex fab |
| Cryo LiNbO$_3$ modulator (FIG. 1C) | ~1 V Requires amplification | ~1000 pJ/b estimated | Separate mod. for each bit. Requires WDM mod/demod for single fiber | Separate parts |
| Cryo polymer mod, not yet verified (FIG. 1C) | ~250 mV (est.) | ~250 pJ/b est. | Separate mod. for each bit. Requires WDM mod/demod for single fiber | Separate parts |

FIG. 1A describes an electrical amplifier approach (without conversion to the optical domain), using cooled transistor amplifiers to achieve a gain of a factor ~1000, or about 60 dB. SiGe heterojunction bipolar transistor (HBT) amplifiers tend to perform well at cryogenic temperatures, with performance superior to that at room temperature. The amplifiers should preferably be distributed over two or more temperature stages, in order to minimize heating the 4K stage. Most practical cryogenic systems are built around commercial cryogenic refrigerators known as cryocoolers, and most 4K cryocoolers have at least one cooling stage at an intermediate temperature, such as 60 K. However, low-attenuation broadband cables are unavoidably also good thermal conductors, making the tradeoffs unfavorable if minimal heat dissipation on the coldest stage is critical.

FIG. 1B describes a cryogenic laser which can be modulated by the electrical signal from the superconducting circuit. However, most semiconductor laser drivers require voltages of ~1V or more to generate significant modulation. One preferred type of semiconductor laser for integrating with circuits is a vertical cavity surface emitting laser (VCSELs). Some VCSELs function at cryogenic temperatures, but their power dissipation is not really low enough for placement on a 4K stage, and would impose a relatively high load on the cryocooler. It has been proposed to mount a VCSEL at an intermediate temperature ~40-70 K, connected to the superconducting circuit by a low-attenuation superconducting transmission line. However, despite preliminary reports of low voltage sensitivity for some VCSELs, it is likely that a cold transistor preamplifier driver would still be required. This configuration requires a separate laser, fiber, input cable, and preamplifier for each bit, making the packaging of a large number of parallel bits rather problematic.

Two alternative electro-optic modulators (FIG. 1C) are described in Table 2: a classical EO material—$LiNbO_3$, and newer polymeric EO materials, such as amorphous polycarbonate and polymethacrylate (PMMA). See, e.g., U.S. Pat. No. 6,751,396; US 2002/0105948. The polymeric materials are somewhat more voltage-sensitive than $LiNbO_3$. However, while the cryogenic performance of $LiNbO_3$ is well established, little has been demonstrated on the cryogenic electro-optic properties of the polymeric materials. In any case, the necessary input voltage of these established EO modulators is expected to be relatively large and essentially independent of temperature, so that an input preamplifier would be required, as shown in FIG. 1C.

In contrast, the block diagram of FIG. 4 describes a cryogenic graphene modulator without the need for an input preamplifier, which should require only ~1 mV input amplitude at 4 K. The dissipation level at 4 K is sufficiently low (~0.3 mW or less) that the modulator can be closely integrated with the superconducting circuits without interfering with their temperature control or operation. A graphene modulator can be based on one layer, or have multiple graphene layers, e.g., two layers. In either case, the mechanism is the same—field-effect shifting of the Fermi energy of the graphene sheet. With one sheet, the voltage is applied with respect to a metallic electrode across a thin dielectric. With two graphene sheets, the voltage is applied across the dielectric between the sheets, and the Fermi energy shifts in opposite directions in the two sheets, as shown in FIG. 3.

A single graphene sheet may be deposited by chemical vapor deposition (CVD) or plasma-enhanced chemical vapor deposition (PECVD). The graphene sheet may be deposited on top of a variety of substrates including silicon, silicon nitride, silicon dioxide, and aluminum oxide. See, for example, US 2011/0303899; US 2014/0255621, Gao, Libo; Ni, Guang-Xin; Liu, Yanpeng; Liu, Bo; Castro Neto, Antonio H.; Loh, Kian Ping; "Tl-Face-to-face transfer of wafer-scale graphene films", Nature 2014/01/09 505(7482) pp. 190-194, dx.doi.org/10.1038/nature12763. A double graphene sheet may be produced by depositing the first graphene sheet, followed by thin dielectric insulator such as aluminum oxide, followed by the second graphene sheet.

While direct vacuum deposition of one or more graphene sheets onto the desired substrate is preferred, an optimized method for depositing high-quality graphene may not be available on some substrates. Therefore, an alternative method involves transfer of a graphene sheet deposited on a different substrate, etched from that substrate, and transferred to the desired substrate. See, e.g., U.S. Pat. No. 8,906,245; US 2014/0231002; U.S. Pat. Nos. 9,023,166; 8,926,852.

Figure 2:
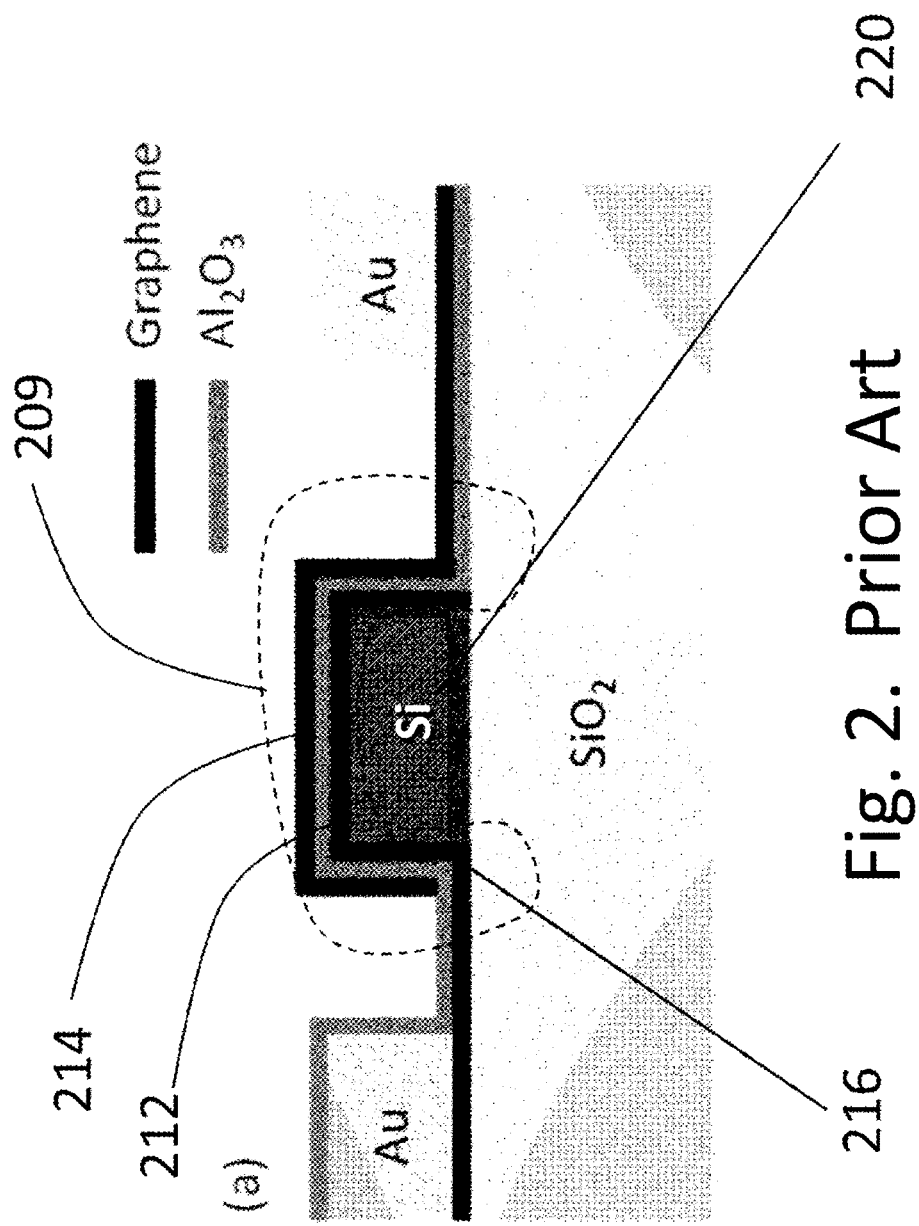
FIG. 2 shows a layout of a prior art graphene electro-optic modulator, from Liu et al (U.S. Pat. No. 9,360,689 B2, US 2014/0056551 A1).

The optical signal may preferably be confined in an optical waveguide (see FIG. 2), which may comprise a core of silicon or silicon nitride, surrounded by silicon dioxide with a smaller index of refraction. The graphene layer(s) may border part of the core, so that modulated absorption of part of the light in the graphene layer may modulate the optical signal.

It is further noted that the optical energy may be coupled to electrons in graphene to resemble Dirac fermion photon coupling, Antonio H. Castro Neto, "Graphene: Phonons behaving badly," Nature Materials, vol. 6, p. 176, March 2007; Gupta, Awnish, et al. "Raman scattering from high-frequency phonons in supported n-graphene layer films." Nano letters 6.12 (2006): 2667-2673; Yan, Jun, et al. "Electric field effect tuning of electron-phonon coupling in graphene." Physical review letters 98.16 (2007): 166802; Sensale-Rodriguez, Berardi, et al. "Broadband graphene terahertz modulators enabled by intraband transitions." Nature communications 3 (2012): 780; Berardi Sensale-Rodriguez, "Graphene-Based Optoelectronics", J. Lightwave Tech., 33(5):1100-1108 (Mar. 1, 2015); Andersen, David R. "Graphene-based long-wave infrared TM surface plasmon modulator." JOSA B 27.4 (2010): 818-823; Li, Wei, et al. "Ultrafast all-optical graphene modulator." Nano letters 14.2 (2014): 955-959. This has implications for a graphene structure that carries the optical energy over some distance, and which can be modulated by external influences over that distance. See also, Bart Ludbrook, Giorgio Levy, Pascal Nigge, Marta Zonno, Michael Schneider, David Dvorak, Christian Veenstra, Sergey Zhdanovich, Douglas Wong, Pinder Dosanjh, Carola StraBer, Alexander Stohr, Stiven Forti, Christian Ast, Ulrich Starke, Andrea Damascelli, "Evidence for superconductivity in Li-decorated monolayer graphene", arXiv:1508.05925v2, PNAS, 112 (38):11795-11799 (Sep. 22, 2015); Jin-Soo Shin and Jin Tae Kim, "Broadband silicon optical modulator using a graphene-integrated hybrid plasmonic waveguide", Nanotechnology 26 (2015) 365201 (8pp) doi:10.1088/0957-4484/26/36/365201.

In a preferred embodiment of the invention, portions of the optical waveguide may comprise a micro-ring resonator, similar to that shown in FIG. 3. The resonant frequencies of such a resonator are determined by $n\lambda = 2\pi R$, where R is the radius of the ring, $\lambda$ is the wavelength of the light in the resonator, and n is an integer. Note that alternative resonator designs may produce similar results, such as a linear resonator of length $L = n\lambda/2$.

At least a portion of the resonator may be in contact with at least one graphene sheet, the Fermi energy of which may be tuned using an applied voltage. This will change the optical absorption coefficient of the graphene, modulating the resonant frequency and Q of the resonator. Furthermore, the resonator may be coupled to an optical transmission line, also comprising an optical waveguide. If an applied microwave frequency signal is applied to the graphene sheet(s), this will induce a change in the effective impedance of the resonator. If a resonant frequency optical carrier signal is propagating along the transmission line, such a change in the impedance will modulate the optical carrier signal.

Figure 6:
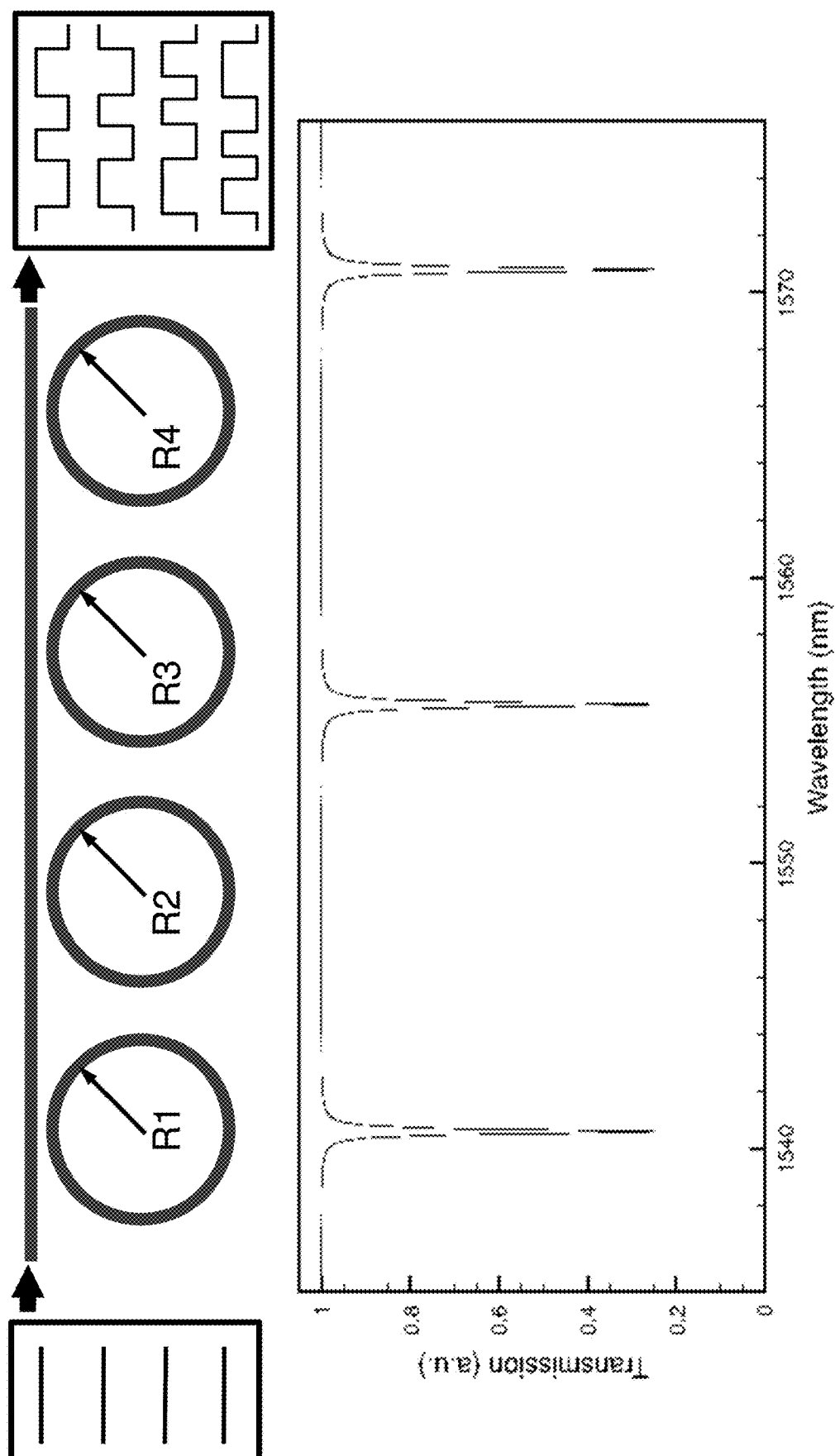
FIG. 6 shows a conceptual diagram of a wavelength-division multiplexed optical output line comprising a series of optical resonators with slightly different resonant frequencies.

In a further preferred embodiment of the invention, a plurality of resonators may be coupled to the same optical transmission line, but the resonators are designed to have slightly different resonant frequencies (see FIG. 6). This may be achieved by fabricating circular resonators with slightly different radii (although the resonators do not necessarily need to be circular). For example, a set of resonators may be designed to have resonant frequencies that form a frequency comb, a set of frequencies with fixed frequency separations. An input optical signal can be generated that comprises such a frequency comb, as also shown in FIG. 6. The frequency comb may establish a set of orthogonal frequencies, and thus permit close spacing of the frequencies without high risk of intersymbol interference. Such an optical frequency comb generator is known in the prior art, see, e.g., US 2008/0285606. Only the component associated with a given resonator will couple to that resonator, and produce a modulation that reflects the voltage applied to the graphene sheet. So an array of N resonators can simultaneously couple modulated signals to a single optical output line comprising the modulated frequency comb. This may be launched onto an optical fiber to a receiver at room temperature (or any other temperature). The receiver can demodulate each of the resonant frequencies, and reconstruct the N signals in parallel.

The example in FIG. 6 shows an optical wavelength of order 1550 nm, which corresponds to an infrared optical signal in the most common band for optical fiber communications. But the response of graphene is quite broad across much of the infrared and visible spectrum, so that any other optical bands could also be used.

There are significant advantages in the use of a single output fiber, particularly when the number N is large. For example, one may employ an array of 64 resonators to output the elements of a 64-bit digital word. Sending them on a single line will help to assure that proper synchronization is maintained. Furthermore, device packaging and integration may be greatly simplified.

Figure 5:
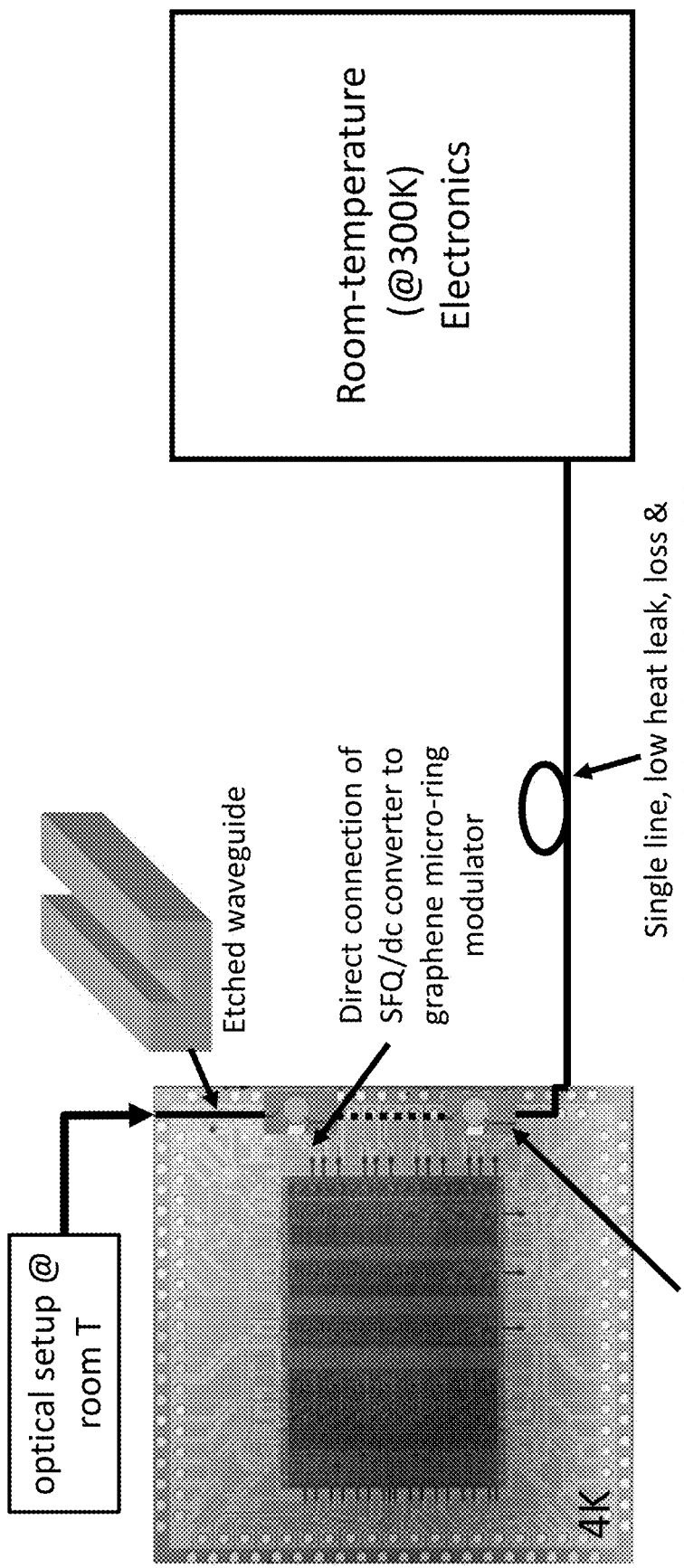
FIG. 5 shows a conceptual diagram of a superconducting electronic chip with integrated optical modulator readout.

FIG. 5 presents a preferred embodiment showing how the optical output devices may be integrated with superconducting circuits on the same chip, using standard wafer-scale lithography processes. Optical waveguide structures (the transmission line and the N resonators) may first be fabricated by etching and deposition of materials such as silicon nitride and silicon dioxide, together with the graphene bilayers (see, e.g., WO 2014/089,454). The superconducting integrated circuits, which comprise a multilayer sequence of low-temperature deposition and patterning processes, can then be processed on the same wafer, and diced into chips. Some examples of integrated superconducting deposition sequences based on niobium Josephson junctions are presented in the following patents: U.S. Pat. No. 8,301,214; US 2015/0119253; U.S. Pat. No. 7,615,385.

There are a wide variety of cryogenic electronic systems that may benefit from the use of low-voltage optical output, at temperatures from ~100 K down to 100 mK and below. The examples above focused on digital outputs from fast superconducting computers operating at 4K, based on niobium Josephson junctions. These optical output systems may also be used for digital outputs from precision cryogenic instruments such as fast digital samplers, digital radio receiver systems, and ultrafast switching networks. Similar modulators can also be used for analog output, from superconducting and other cryogenic sensor arrays. These may include, for example, SQUID sensors for biomagnetic imaging, single-photon sensors for astronomical imaging (based on superconducting nanowires, transition-edge sensors, kinetic inductance bolometers, or superconducting tunnel junctions), terahertz heterodyne receivers (based on superconducting tunnel junctions, hot-electron microbolometers, or cooled Schottky diodes), and superconducting quantum interference filter (SQIF) arrays for sensitive radio receivers. See, e.g., U.S. Pat. Nos. 6,665,553; 7,078,694; 7,991,013 ; 7,598,897; 7,362,125; 8,179,133; 6,310,350. They may also include outputs from arrays of elements in cryogenic quantum computing systems, which may operate at temperatures of 100 mK or below. Advantageously, graphene may also be used to implement qubits of the quantum computers, and therefore the graphene deposition for external interfacing may occur in a common process with deposition to form the qubit.

The range of systems that may benefit from the use of graphene electro-optic modulators may also include high-temperature superconducting systems, based on cuprates that may operate as high as ~100 K, magnesium diboride devices that may operate up to 40 K, and iron-based superconductors that may operate up to ~50 K, as well as non-superconducting sensors that operate in the cryogenic regime up to ~100 K. See, e.g., CA 2600414; U.S. Pat. Nos. 8,155,318; 7,132,655.

These examples are not to be understood as limiting the invention, but rather as examples that illustrate the wide range of systems and applications that may become clear to those skilled in the art.

Each reference cited herein is expressly incorporated herein in its entirety, for its respective descriptions and teachings. The scope of the present invention includes the various combinations, subcombinations and permutations of the elements disclosed herein either expressly or through incorporation. No element shall be deemed critical or required unless specified a being a necessary element.

What is claimed is:

1. An optoelectronic modulator, comprising:
    an input port, configured to receive an electronic signal;
    an optical input port, configured to receive an optical signal; and
    an electro-optic modulator, comprising a layer of graphene, configured to modulate the optical signal in dependence on the electronic signal, having a full scale response magnitude less than about 10 mV, to produce a modulated optical signal having at least one of an amplitude modulation of at least 0.05 dB and a phase modulation of at least 0.05 radians.

2. The optoelectronic modulator according to claim 1, further comprising an optoelectronic demodulator, configured to demodulate the electronic signal from the modulated optical signal.

3. The optoelectronic modulator according to claim 1, wherein the electro-optic modulator is configured to operate at a temperature below about 100K.

4. The optoelectronic modulator according to claim 1, further comprising at least one superconducting path configured to operate at a temperature below about 100K.

5. The optoelectronic modulator according to claim 1, wherein the modulated optical signal has at least 0.2 dB of amplitude modulation.

6. The optoelectronic modulator according to claim 1, wherein the modulated optical signal has at least 0.2 radians phase modulation.

7. The optoelectronic modulator according to claim 1, wherein the electronic signal has at least one frequency component greater than about 1 GHz, and the modulated optical signal represents the at least one frequency component greater than about 1 GHz with a signal to noise ratio of at least 1 dB and at least one of an amplitude modulation of at least 0.2 dB and a phase modulation at least 0.1 radians.

8. The optoelectronic modulator according to claim 1, wherein the modulated optical signal is modulated with a bandwidth of at least 10 GHz.

9. The optoelectronic modulator according to claim 1, wherein the layer of graphene is configured to change optical properties in response to the at least one input signal to modulate the optical signal.

10. The optoelectronic modulator according to claim 1, wherein the layer of graphene modulates the optical signal responsive to changes in the at least one input signal to produce the modulated optical signal having a signal to noise ratio of at least 1 dB.

11. The optoelectronic modulator according to claim 1, comprising a superconducting circuit and the electro-optic modulator integrated on a common substrate.

12. The optoelectronic modulator according to claim 1, comprising a second input port configured to receive a second electronic signal, wherein the electro-optic modulator is further configured to modulate the second electronic signal on the optical signal as a multiplexed modulation of the electronic signal and the second electronic signal.

13. The optoelectronic modulator according to claim 12, wherein the multiplexed modulation comprises wavelength division multiplexing a plurality of different optical signal wavelengths.

14. The optoelectronic modulator according to claim 1, further comprising an optical waveguide integrated into a common substrate with the electro-optic modulator, adjacent to the layer of graphene.

15. The optoelectronic modulator according to claim 1, wherein the electro-optic modulator comprises an optical resonator.

16. The optoelectronic modulator according to claim 15, wherein the optical resonator comprises a micro-ring resonator.

17. The optoelectronic modulator according to claim 1, wherein the electro-optic modulator comprises a plurality of optical resonators having different resonant frequencies, each driven by a respective electronic signal.

18. The optoelectronic modulator according to claim 1, wherein the electro-optic modulator is configured to operate at a temperature of about 4 K.

19. A method of modulating an optical signal, comprising:
receiving an electronic signal;
receiving an optical signal; and
modulating the optical signal with an electro-optic modulator comprising a layer of graphene having a full scale magnitude less than about 10 mV, to produce a modulated optical signal having at least one of an amplitude modulation of at least 0.05 dB and a phase modulation of at least 0.05 radians.

20. An optical modulator, comprising:
at least one layer of graphene, receiving a voltage input signal having a full scale amplitude less than about 10 mV, at a temperature of less than about 100 K, responsive to the input signal to modulate an incident optical signal at a bandwidth of at least 1 GHz and a signal to noise ratio of at least 1 dB, to produce a modulated optical signal having at least one of an amplitude modulation of at least 0.05 dB and a phase modulation of at least 0.05 radians; and
a port, configured to transmit the modulated incident optical signal.

* * * * *